July 6, 1943.  S. A. FRED  2,323,813
WHEEL MOUNTING
Filed March 6, 1941  2 Sheets-Sheet 1

Inventor:
Selim A Fred
By Charles A Warren
Attorney

July 6, 1943.　　　　S. A. FRED　　　　2,323,813

WHEEL MOUNTING

Filed March 6, 1941　　　　2 Sheets-Sheet 2

Inventor:
Selim A. Fred
By Charles A. Warren
Attorney

Patented July 6, 1943

2,323,813

UNITED STATES PATENT OFFICE 2,323,813

WHEEL MOUNTING

Selim A. Fred, Gardner, Mass., assignor to Heywood-Wakefield Company, Gardner, Mass., a corporation of Massachusetts Application March 6, 1941, Serial No. 381,963

4 Claims. (Cl. 301—118)

The present invention relates to devices employed for detachably holding a vehicle wheel on its axle and is especially adapted for wheel mountings for baby carriages and the like.

In prior devices of this character the wheel has generally been held in place either by a cotter pin extending through the outer end of the axle or by a latch attached to the axle and adapted to engage a flange on the hub of the wheel, the latch restraining any endwise movement of the wheel. In either case the end thrust on the wheel has eventually worn away the cotter pin or the flange or latch, resulting in increasing endwise play of the wheel on the axle and eventual inadvertent removal of the wheel from the axle. According to the present invention the above difficulties are overcome by mounting the wheel for rotation on a sleeve and locking the sleeve in turn securely upon the axle, thereby providing a mounting which will last the life of the carriage.

It has been the general practice in baby carriage construction to attach an ornamental hub cap to the outside of the wheel, with the result that the hub cap turns with the wheel. Since the wheel does not always stop in the same predetermined position, an ornamented or unsymmetrical hub cap is unsuitable since it will not remain in the proper vertical position. A further feature of the invention resides in attaching the hub cap to the wheel mounting so that the hub cap does not rotate.

For reducing the space required in shipping baby carriages it has been desirable to crate the carriages with the wheels removed from the axles and it is essential that the arrangement for mounting the wheels be such that no mechanical skill is required in properly attaching the wheels to the axles. A further feature of the invention resides in a simple wheel mounting which can readily be manipulated by an individual having no mechanical inclinations.

Other and further objects and advantages of the invention will more fully appear from the following detailed description taken in connection with the accompanying drawings, in which—

Figure 2:
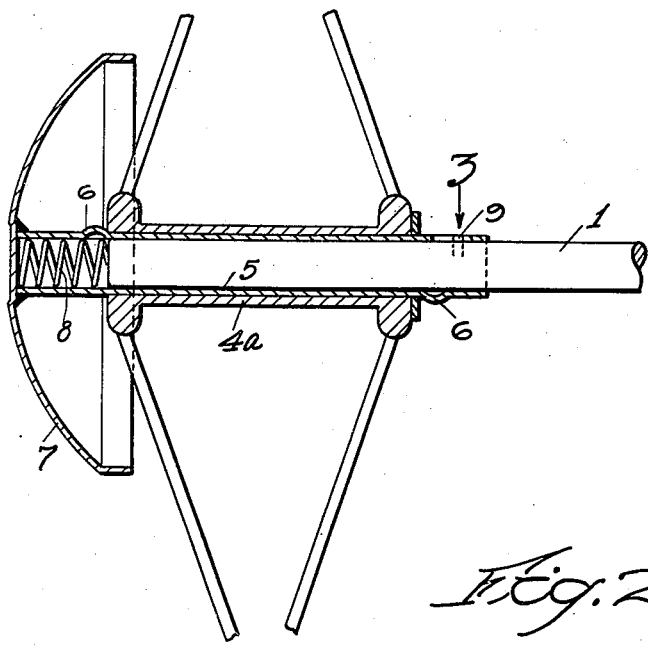
Fig. 2 is a sectional view on a larger scale through the wheel and axle with the rim of the wheel removed.
Figure 4:
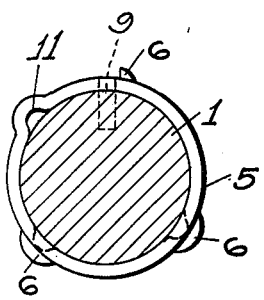
Fig. 4 is a sectional view along the line 4—4 of Fig. 3.
Figure 1:
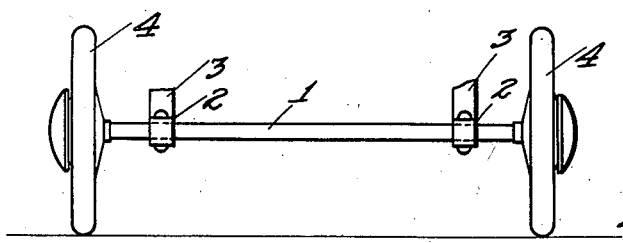
Fig. 1 is an elevation of an axle of a baby carriage or the like, showing opposed wheels locked thereon.

Referring first to Fig. 1, the axle 1 for the baby carriage or other vehicle is held by clips 2 to the under carriage 3 of the vehicle so that the axle does not rotate. Although the axle may be round or square in cross section between its ends, the wheel receiving ends thereof are cylindrical, as best shown in Figs. 2 and 4. In the arrangement shown the axle is cylindrical throughout its entire length.

As shown in Fig. 2, the hub 4a of the wheel 4 is mounted for rotation on a sleeve 5 which extends through the hub of the wheel and which is adapted to fit over the end of the axle. The wheel is held against endwise movement on the sleeve by protuberances 6 and 6' formed on the sleeve at opposite ends of the wheel hub, as by forcing the metal of the sleeve outwardly, as shown. The protuberances 6 at the inner end of the hub may be formed after the sleeve is inserted in the hub for ease of assembly, if desired.

The sleeve 5 is considerably longer than the hub of the wheel and has mounted on the outer end thereof a hub cap 7 which may be unsymmetrical or may be ornamented as by a monogram or other figure thereon. Within the end of the sleeve adjacent to the hub cap is a coil spring 8 engageable with the end of the axle, as will be apparent.

Figure 3:
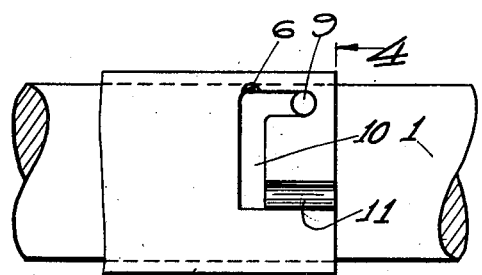
Fig. 3 is a fragmentary plan view showing a detail of the locking mechanism looking in the direction of the arrow 3 of Fig. 2.

Adjacent the inner end of the sleeve the axle has a radially projecting pin 9 engageable in a bayonet slot 10 formed in the sleeve, as shown in Fig. 3, so that the sleeve may be locked securely on the axle with the spring 8 holding the pin securely within the end of the bayonet slot. the end of the slot 10 remote from the pin communicates with an axially extending groove 11 formed in the sleeve to permit the latter to pass over the pin in mounting the sleeve and wheel on the axle.

It will be seen that the wheel and sleeve, together with the attached hub cap, are assembled to form a wheel unit and are mounted on the axle as a unit. The wheel unit is attached to the axle by sliding the sleeve 5 over the end of the axle against the tension of the spring 8 so that the pin passes through the groove 11 and enters the bayonet slot. By then turning the sleeve angularly, the pin 9 will traverse the circumferential portion of the slot 10, until it reaches the right angle bend therein, whereupon release of the hub cap 7 permits the then compressed spring 8 to shift the sleeve assembly to the left, until the pin 9 reaches the right-hand end of the axial slot portion. This final position is shown in Fig. 3, from which it is evident that the sleeve will be locked securely on the axle, with the wheel free to rotate on the sleeve, although held from endwise movement thereon by the cooperating protuberances 6.

When it is desired to remove a wheel unit, it is only necessary to exert pressure on the hub cap 7 in the direction of the axle, thereby compressing the spring 8 and shifting the pin 9 into register with the circumferential portion of the slot 10. A slight turning movement of the sleeve then results in registering the pin with the groove 11, whereupon release of the pressure on the hub permits the compressed spring to shift the sleeve bodily to the left, to free the pin 9 from the sleeve groove 11 without any effort by the person taking off the wheel.

Figure 5:
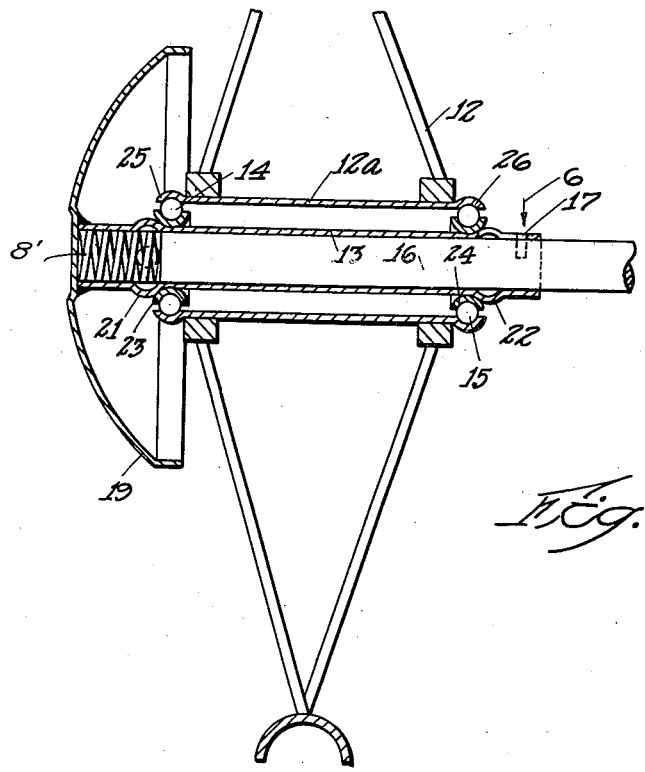
Fig. 5 is a sectional view corresponding to Fig. 2 and showing a modification.
Figure 7:
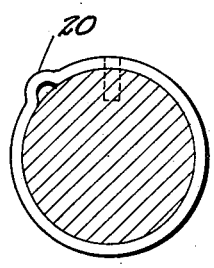
Fig. 7 is a sectional view along the line 7—7 of Fig. 6.
Figure 6:
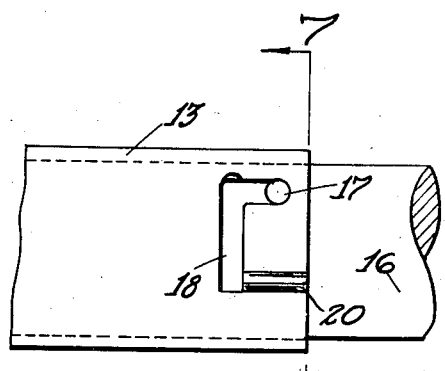
Fig. 6 is a fragmentary plan view looking in the direction of the arrow 6 of Fig. 5.

A similar arrangement for a wheel mounting is shown in Figs. 5, 6 and 7, with the added feature that the wheel is mounted on ball bearings to minimize the frictional resistance between, and wear on, the parts of the wheel mounting.

Referring now to Fig. 5, the hub 12a of the wheel 12 is supported for rotation on the sleeve 13 by spaced sets of ball bearings 14 and 15 at opposite ends of the wheel hub. The sleeve 13 is in turn mounted on the axle 16 by a mechanism similar to that described above in connection with Figs. 1 to 4. The axle 16 has a pin 17 engageable in a bayonet slot 18 in the sleeve 13 and the hub cap 19 is mounted on the end of the sleeve remote from the bayonet slot. The sleeve 13 has an axially extending groove 20 communicating with the bayonet slot to permit the sleeve to be slid over the axle far enough for the pin 17 to engage with the slot 18.

The sleeve 13 has protuberances 21 and 22 thereon engageable with the other surfaces of the opposed inner raceways 23 and 24 for the bearings to prevent endwise movement of the wheel on the sleeve. It will be understood that the protuberances 22 may be formed after the wheel and sleeve are assembled for ease of manufacture.

The hub of the wheel, which comprises a sleeve, has annular grooves 25 and 26 formed thereon for the outer raceways of the ball bearings. In this arrangement, as in the arrangement of Figs. 1 to 4, the wheel assembly, including the stationary sleeve, may be readily mounted on the axle without the use of any tools, and by an individual entirely unfamiliar with mechanical structures.

In the wheel mountings above described the wheel spokes are suitably attached to the wheel hub by any well known structure, which, not being a part of the present invention, is not described or shown in detail.

I claim:

1. In a wheel mounting, a wheel, a sleeve on which the wheel is journalled, an axle on which the sleeve is removably positioned and means for locking the sleeve against rotation on the axle, said locking means including a short projection on the axle adjacent the inner end of the sleeve, said sleeve having a slot adjacent its inner end to receive the projection, with the end of said slot extending toward the inner end of the sleeve and a spring positioned within the outer end of the sleeve for engagement with the end of the axle to retain the projection within the inner end of the slot, and a hub cap permanently secured to the outer end of the sleeve out of contact with the wheel to permit the latter to rotate independenly of said hub cap.

2. In a wheel mounting, a wheel, a sleeve on which the wheel is journalled, said sleeve having integral outwardly extending protuberances in spaced relation for engagement with the wheel to limit endwise movement thereof, an axle on which the sleeve is removably positioned and means for locking the sleeve against rotation on the axis, said locking means including a short projection on the axle adjacent the inner end of the sleeve, said sleeve having a slot adjacent its inner end to receive the projection, with the inner end of said slot extending toward the inner end of the sleeve and a spring positioned within the outer end of the sleeve for engagement with the end of the axle to retain the projection within the inner end of the slot, and a hub cap permanently secured to the outer end of the sleeve out of contact with the wheel to permit the latter to rotate independently of said hub cap.

3. In a wheel mounting, a wheel, a sleeve on which the wheel is journalled, said sleeve being closed at one end and providing integral outwardly extending abutments in spaced relation for engagement with the hub of said wheel to limit endwise movement thereof, an axle providing a radial projection receivable in a slot provided by an open end of said sleeve when the latter is shifted on said axle toward said projection, with said sleeve slot having portions extending axially and circumferentially thereof, so that combined axial and angular movement of said sleeve with respect to said axle serves to position said projection at the end of an axial portion of said slot to lock said sleeve against rotation on the axle, and a spring interposed between the end of said axle and the closed end of said sleeve for yieldably maintaining said axle projection in its locked position in said slot.

4. In a wheel mounting, a wheel, a sleeve on which the wheel is journaled, said sleeve providing integral outwardly extending abutments in spaced relation for engagement with the hub of said wheel to limit endwise movement thereof, a hub cap attached to said sleeve and closing one end thereof, an axle on which the sleeve is shiftable towards a radial projection on said axle, said sleeve providing a slot at the end opposite to said hub cap having portions extending axially and circumferentially thereof to receive said axle projection, and a spring interposed between the end of said axle and said hub cap for maintaining said projection at the end of an axial portion of said slot to lock said sleeve against rotation on said axle.

SELIM A. FRED.